(12) United States Patent
Liu et al.

(10) Patent No.: US 9,777,097 B2
(45) Date of Patent: Oct. 3, 2017

(54) THERMAL AND PHOTO-INITIATION CURING SYSTEM OF PHOTOPOLYMER RESIN FOR 3D PRINTING

(71) Applicant: Full Spectrum Laser, LLC, Las Vegas, NV (US)

(72) Inventors: Henry Liu, Las Vegas (CA); Chunlin He, Las Vegas (CN)

( * ) Notice: Subject to any disclaimer, the term of this patent is extended or adjusted under 35 U.S.C. 154(b) by 0 days.

(21) Appl. No.: 15/203,574

(22) Filed: Jul. 6, 2016

(65) Prior Publication Data

US 2017/0022312 A1 Jan. 26, 2017

Related U.S. Application Data

(62) Division of application No. 14/806,508, filed on Jul. 22, 2015, now Pat. No. 9,574,039.

(60) Provisional application No. 62/027,493, filed on Jul. 22, 2014.

(51) Int. Cl.
| | |
|---|---|
| *C08F 2/50* | (2006.01) |
| *C08F 2/46* | (2006.01) |
| *C08G 61/04* | (2006.01) |
| *C08F 226/02* | (2006.01) |
| *B29C 67/00* | (2017.01) |
| *C09J 4/06* | (2006.01) |
| B33Y 10/00 | (2015.01) |
| B33Y 70/00 | (2015.01) |
| B29K 33/00 | (2006.01) |

(52) U.S. Cl.
CPC ........ *C08F 226/02* (2013.01); *B29C 67/0085* (2013.01); *C09J 4/06* (2013.01); *B29K 2033/08* (2013.01); *B33Y 10/00* (2014.12); *B33Y 70/00* (2014.12)

(58) Field of Classification Search
CPC .................................................... C08F 226/02
USPC ...... 522/16, 12, 7, 6, 71, 189, 184, 1; 520/1
See application file for complete search history.

(56) References Cited

U.S. PATENT DOCUMENTS

| | | | |
|---|---|---|---|
| 6,545,064 B1 * | 4/2003 | Bilodeau | C09D 4/00 522/13 |
| 2006/0287408 A1 * | 12/2006 | Baikerikar | C03C 17/007 522/71 |
| 2015/0065602 A1 * | 3/2015 | Kim | C09J 4/00 522/81 |
| 2015/0252227 A1 * | 9/2015 | Zajaczkowski | C09J 4/06 522/6 |

FOREIGN PATENT DOCUMENTS

WO 2014-059057 * 4/2014

\* cited by examiner

*Primary Examiner* — Ling Choi
*Assistant Examiner* — Jessica E Whiteley
(74) *Attorney, Agent, or Firm* — FisherBroyles LLP; Rob L. Phillips

(57) ABSTRACT

Photopolymer resin formulation for 3D printing enhancing the performance of 3D printed objects. In one example, additives comprising two photoinitiators with different absorption spectrums are used to achieve printing and post-curing processes. A thermal initiator can also be used to complete the post-curing process by baking at appropriate temperature. Additive combinations balanced to absorb some light in the near UV range of about 400 nm to about 420 nm absorption wavelength band or spectrum while fluorescing light at frequencies higher than their absorption wavelength allowing the creation of clear transparent materials using only near UV light sources (i.e., about 400 nm to about 420 nm) instead of deep UV (<400 nm) light sources.

3 Claims, 4 Drawing Sheets

THERMAL AND PHOTO-INITIATION CURING SYSTEM OF PHOTOPOLYMER RESIN FOR 3D PRINTING

CROSS-REFERENCE

This application claims priority to and is a Divisional application of U.S. patent application Ser. No. 14/806,508 filed Jul. 22, 2015 which claims priority to U.S. Patent Application No. 62/027,493 filed Jul. 22, 2014 both of which is incorporated herein for any and all purposes.

FIELD OF THE INVENTION

The embodiments of the present invention relate to additive use in photopolymer resin formulations for 3D printing systems, including, but not limited to, stereolithography.

BACKGROUND OF THE INVENTION

Three dimensional (3D) printing or additive manufacturing is a process in which a 3D digital model is manufactured by the accretion of construction material. The 3D printed object is created by utilizing the computer-aided design (CAD) data of an object through sequential construction of two dimensional (2D) layers or slices that correspond to cross-sections of 3D objects. Stereolithography (SL) is one type of additive manufacturing where a liquid resin is hardened by selective exposure to a radiation to form each 2D layer. The radiation can be in the form of electromagnetic waves or an electron beam. The most commonly applied energy source is ultraviolet, visible or infrared radiation. The liquid photopolymer resin can contain monomers, oligomers, fillers and additives such as photoinitiators, blockers, colorants and other types depending on the targeted properties of the resin.

In the past, the focus of the SL resins has been in the deep range at about 355 nm. These sources work well and there are many formulations for these sources. However, lasers at 355 nm are extremely expensive relying on frequency tripled YVO4 laser crystal technology. Furthermore, DLP projectors are typically unreliable due to UV breakdown the farther away from visible light and are not generally compatible with frequencies below 400 nm. Due to the recent commercialization of Blu-ray laser diodes capable of directly emitting at 405 nm and production of 400 nm to 420 nm direct violet LEDs used in the production of white light bulbs leading to low cost light sources, there has been increased interest in creating SL resins that can function with near UV sources in the about 400 nm to about 420 nm range.

One challenge encountered with SL is the incomplete curing of the printed 3D object including the surface and interior of the printed 3D objects. If the 3D object is cured completely during the 3D printing process, the interlayer adhesion is too weak and the print may fail. In addition, the material may stick to parts of the printing apparatus and not release properly. Hence, it is desirable to cure only in the range of (5% to 99%) and not 100% during the printing process. Afterwards, the uncured resin needs to be removed from the surface and the remaining resin cured to a higher rate. The uncured liquid resin on the surface of the printed 3D objects can be mostly removed by washing with solvents. However, the uncured resin inside the printed 3D object is difficult to remove. Uncured resin inside is undesirable for a few reasons. First, uncured liquid resin leaking from the printed 3D objects may cause health problems to end users because the liquid resin may contain reactive chemicals. Second, the printed 3D objects do not reach optimal mechanical performance because the uncured liquid resin may soften the object. Third, the uncured resin may cause problems in some industrial applications of the objects where high chemical inertia is required.

In order to fully cure the printed objects, the current art is blending excess photoinitiator and post-curing the parts at similar wavelength light used in the printing process. This solution can be problematic because the excess photoinitiator can cause yellowing in transparent printed parts.

Another challenge encountered with SL is creating clear transparent resin using light in the near UV/violet range. Since the near UV/violet light needs to be absorbed to be reacted with the liquid resin, this violet light is normally removed from the spectrum that can pass through resulting in a yellow appearance.

It would be advantageous to use certain types of additives in photopolymer resin formulations to overcome challenges noted above as well as enhancing the performance of the printed objects without causing an increase in the costs.

SUMMARY

Accordingly, the embodiments of present invention relate to additive manufacturing. More particularly, the embodiments of the present invention relate to SL. Even more particularly, the embodiments of the present invention relate to photopolymer resins used with SL. The embodiments of the present invention demonstrate enhanced performance of printed objects by the proper use of additives in liquid resin formulations for stereolithography 3D printing systems.

Two of the embodiments of the present invention overcome the above-noted first challenge by using two photoinitiators or one photoinitiator and one thermal initiator in the photopolymer resin formulation. Such dual initiation system photopolymer resin formulations allow printed objects to be fully cured in post-curing without losing high performance of the objects.

It is well recognized in the field of liquid photopolymer resins that additives like light blockers are used to finely control the curing thickness of printed layers to achieve the required detail printing. The used blockers can be colorants such as pigments carbon black, blue, red, UV blockers or fluorescent agents/optical brightener. Colorants and UV blockers typically absorb the light and do not retransmit light. Fluorescent agents/optical brighteners absorb light and emit light at a different frequency. When the light absorbed is invisible UV light and the transmitted is in the visible range, the object will appear optically brighter since more visible light is present.

A third embodiment of the present invention uses certain additives to finely control the curing thickness while overcoming the above-noted second challenge by using certain types of additives which work as both light blocker and brightener. In this embodiment, high performance clear printed objects are achieved by using additives which acts as both light blocker and brightener.

Other variations, embodiments, and features of the present invention will become evident from the following detailed description, drawings and claims.

DETAILED DESCRIPTION

Figure 1:
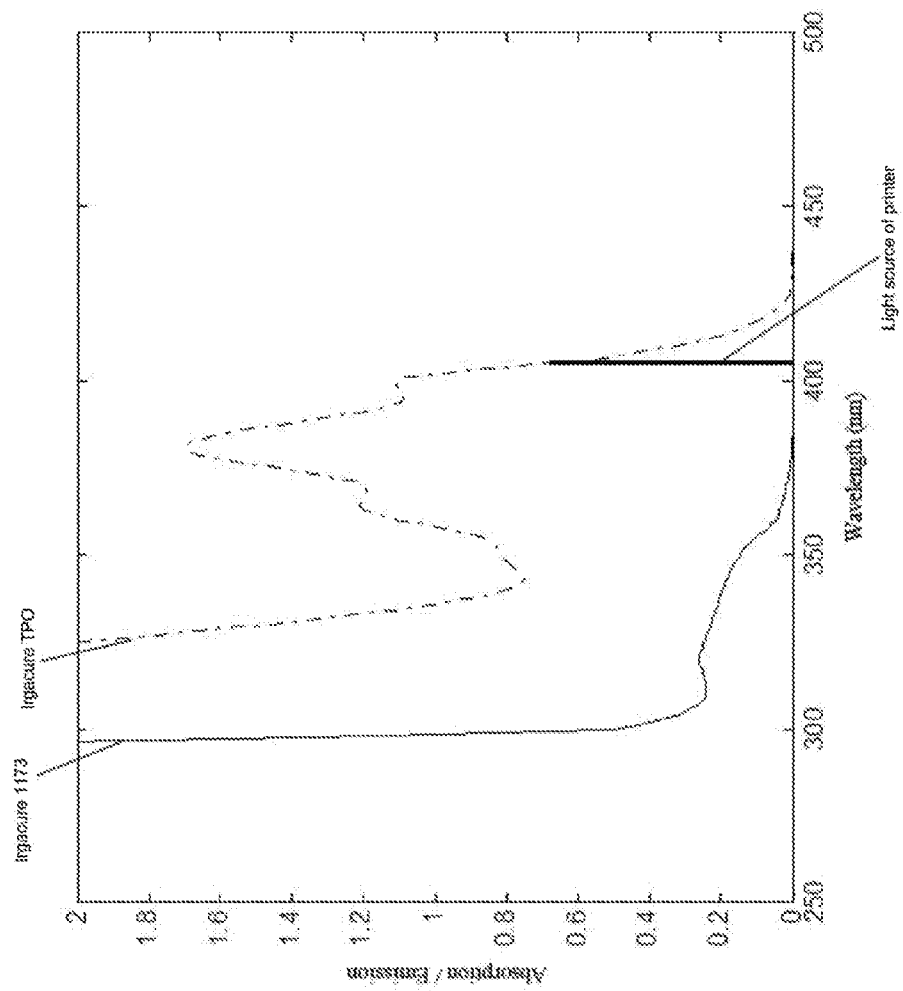
FIG. 1 illustrates an absorption spectrum of Irgacure TPO (CAS: 75980-60-8), Irgacure 1173 (CAS: 7473-98-5) and emission of light source of the 3D printer.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

A few of the advantages of the embodiments of the present invention include: (i) minimizing the hazardous chemicals in printed 3D objects at a low cost; (ii) easy operation for manufacturing large scale photopolymer resin products and (iii) significantly enhancing the performance of printed objects.

Referring now to the first embodiment of the present invention, Table 1 details an exemplary dual photoinitiator resin formulation having about 68.50% by weight of EBECRYL 4858 (CAS: 120146-73-8) (a low viscosity aliphatic urethane diacrylate) (an oligomer), about 24.49% by weight of DPGDA (CAS: 57472-68-1) (dipropylene glycol diacrylate) (a monomer), about 4.95% by weight of EBECRYL 113 (CAS: 1204322-63-3) (a low odor monofunctional acrylated aliphatic epoxy) (a second monomer), about 0.98% by weight of Irgacure TPO (CAS: 75980-60-8) (acyl phosphine oxide photoinitiator), about 0.98% by weight of Irgacure 1173 (CAS: 7473-98-5) (2-Hydroxy-2-methyl-1-phenyl-propan-1-one) (a second photoinitiator) and about 0.10% weight of Benetex OB Plus (CAS: 7128-64-5) (a blocker) (2,2'-(2,5-thiophenediyl)bis(5-tert-butylbenzoxazole).

TABLE 1

| Materials | Concentration (% by weight) | Function |
| --- | --- | --- |
| EBECRYL 4858 (CAS: 120146-73-8) | 68.50 | Oligomer |
| DPGDA (CAS: 57472-68-1) | 24.49 | Monomer |
| EBECRYL 113 (CAS: 1204322-63-3) | 4.95 | Monomer |
| Irgacure TPO (CAS: 75980-60-8) | 0.98 | Photoinitiator |
| Irgacure 1173 (CAS: 7473-98-5) | 0.98 | Photoinitiator |
| Benetex OB Plus (CAS: 7128-64-5) | 0.10 | Blocker |

In further detail, still referring to the embodiments of the present invention as set forth in Table 1, two photoinitiators (Irgacure TPO and Irgacure 1173) with distinct absorption spectra shown in chart 100 of FIG. 1 are used. During the 3D printing process, only the first photoinitiator Irgacure TPO (CAS: 75980-60-8) with significant absorption wavelength starting from about 420 nm to lower wavelengths is initiated to start the polymerization process because its absorption band overlaps the wavelength range of the light source with a peak at about 405 nm. During a post-curing process, a light source with a much lower wavelength initiates the second photoinitiator Irgacure 1173 (CAS: 7473-98-5) with an adsorption wavelength lower than 380 nm which is outside the available wavelengths during the printing process so do not affect the printing quality. It is obvious that variations can be made by using different first photoinitiators and/or second photoinitiators wherein the second photoinitiator has no absorption of the light source used in the 3D printing process. The dual photoinitiator system allows the majority of the resin to be hardened in printing by using one photoinitiator and then fully hardened in post-curing by using another photoinitiator. In addition, a thermal initiator may be added as well (see Table 2). Thermal initiators allow deep post curing without affecting the resin during regular printing.

Referring now to the second embodiment of the present invention, Table 2 details an exemplary resin formulation having one photoinitiator and one thermal initiator. More particularly, a resin formulation having about 68.50% by weight of EBECRYL 4858 (CAS: 120146-73-8) (an oligomer), about 24.49% by weight of DPGDA (CAS: 57472-68-1) (a monomer), about 4.95% by weight of EBECRYL 113 (CAS: 1204322-63-3) (a second monomer), about 0.98% by weight of Irgacure TPO (CAS: 75980-60-8) (a photoinitiator), about 0.98% by weight of benzoyl peroxide (a thermal initiator) and about 0.10% weight of Benetex OB Plus (CAS: 7128-64-5) (a blocker).

TABLE 2

| Materials | Concentration (% by weight) | Function |
| --- | --- | --- |
| EBECRYL 4858 (CAS: 120146-73-8) | 68.50 | Oligomer |
| DPGDA (CAS: 57472-68-1) | 24.49 | Monomer |
| EBECRYL 113 (CAS: 1204322-63-3) | 4.95 | Monomer |
| Irgacure TPO (CAS: 75980-60-8) | 0.98 | Photoinitiator |
| Benzoyl peroxide | 0.98 | Thermal Initiator |
| Benetex OB Plus (CAS: 7128-64-5) | 0.10 | Colorant |

In further detail, still referring to the embodiments of the present invention as set forth in Table 2, the dual initiation system uses two different initiation mechanisms in printing and post-curing. During the 3D printing process, the photoinitiator Irgacure TPO (CAS: 75980-60-8) is initiated to start the polymerization process where the photoinitiator is broken down to generate free radicals under exposure to the light source of the printer while post-baking at about 80 degrees Celsius to activate the thermal initiator benzoyl peroxide to fully cure the printed objects. The initiation temperature of the thermal initiator needs to be carefully monitored and should be higher than the peak local temperature of resin in the printing and lower than the maximum temperature that the printed object can maintain its performance after baking. It is obvious that variations can be made by using the thermal initiator with initiation temperature in the range described above. This dual initiation system allows the majority of the resin to be hardened in printing by using the photoinitiator during printing and fully hardened in post-curing by post-baking.

Referring now to third embodiment of the present invention, Table 3 details an exemplary resin formulation for achieving clear printed objects containing about 69.28% by weight of EBECRYL 4858 (CAS: 120146-73-8) (an oligomer), about 24.75% by weight of DPGDA (CAS: 57472-68-1) (a monomer), about 4.95% by weight of EBECRYL 113 (CAS: 1204322-63-3) (a second monomer), about 0.99% by weight of Irgacure TPO (CAS: 75980-60-8) (a photoinitiator) and about 0.03% by weight of Benetex OB Plus (CAS: 7128-64-5) a light blocker and optical brightener.

TABLE 3

| Materials | Concentration (% by weight) | Function |
| --- | --- | --- |
| EBECRYL 4858 (CAS: 120146-73-8) | 69.28 | Oligomer |
| DPGDA (CAS: 57472-68-1) | 24.75 | Monomer |
| EBECRYL 113 (CAS: 1204322-63-3) | 4.95 | Monomer |
| Irgacure TPO (CAS: 75980-60-8) | 0.99 | Photoinitiator |
| Benetex OB Plus (CAS: 7128-64-5) | 0.03 | Blocker/Brightener |

Figure 2:
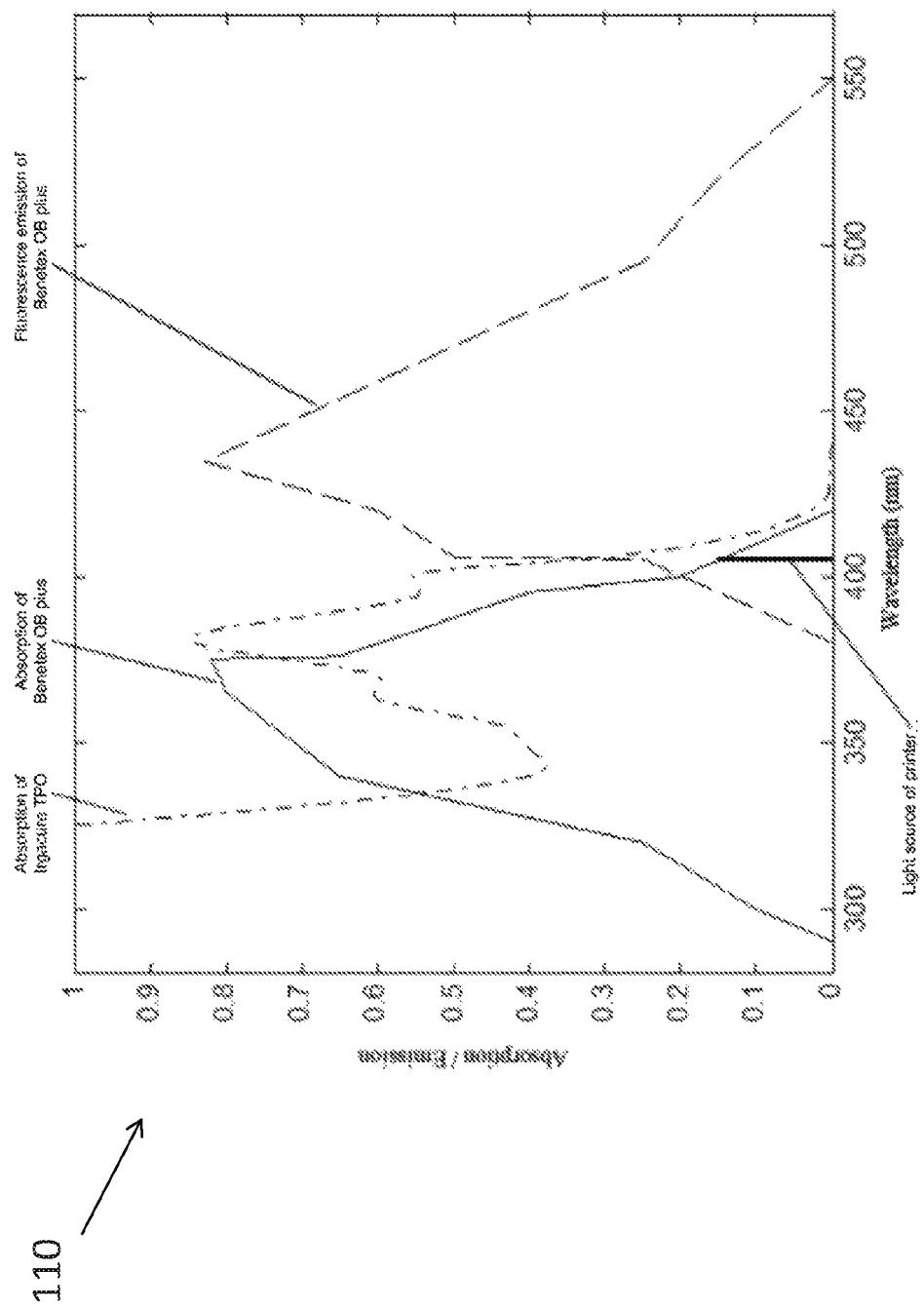
FIG. 2 illustrates an absorption and fluorescence emission spectra of Benetex OB Plus (CAS: 7128-64-5) and emission of light source of the 3D printer.

In further detail, still referring to the embodiments of the present invention as set forth in Table 3, Irgacure TPO (CAS: 75980-60-8) is used as photoinitiator while Benetex OB Plus (CAS: 7128-64-5) is used as blocker and also brightener. As shown in FIG. 2, the absorption band of Benetex OB Plus (CAS: 7128-64-5) covers mostly UV and violet light while the wavelength of the light source used in this embodiment is about 405 nm, and the absorption spectrum of Irgacure TPO (CAS: 75980-60-8) tapers off quickly after about 405 nm. During the printing process, light from the light source is partially absorbed by Benetex OB Plus (CAS: 7128-64-5) and re-emitted outside the absorption of the Irgacure TPO (CAS: 75980-60-8), thus acting as a blocker. As a result, the curing thickness of one layer can be finely tuned by adjusting the concentration of Benetex OB Plus (CAS: 7128-64-5) in the photopolymer resin formulation. Unlike traditional blockers, with Benetex OB Plus (CAS: 7128-64-5) the light that was blocked during curing, is recovered by the fluorescence of OB Plus in the printed part (i.e., for the printed part, UV and violet ambient light is absorbed by Benetex OB Plus (CAS: 7128-64-5) and re-emitted as higher wavelength visible light, overcoming any blocking that was necessary in the curing process. The Benetex OB Plus (CAS: 7128-64-5) here essentially shifts the absorbed UV and violet lights to visible lights and enhances the clearness of the printed parts, while also acting as a blocker during the printing process. It is obvious that variations can be made by using the different additives with similar fluorescence properties.

Figure 3:
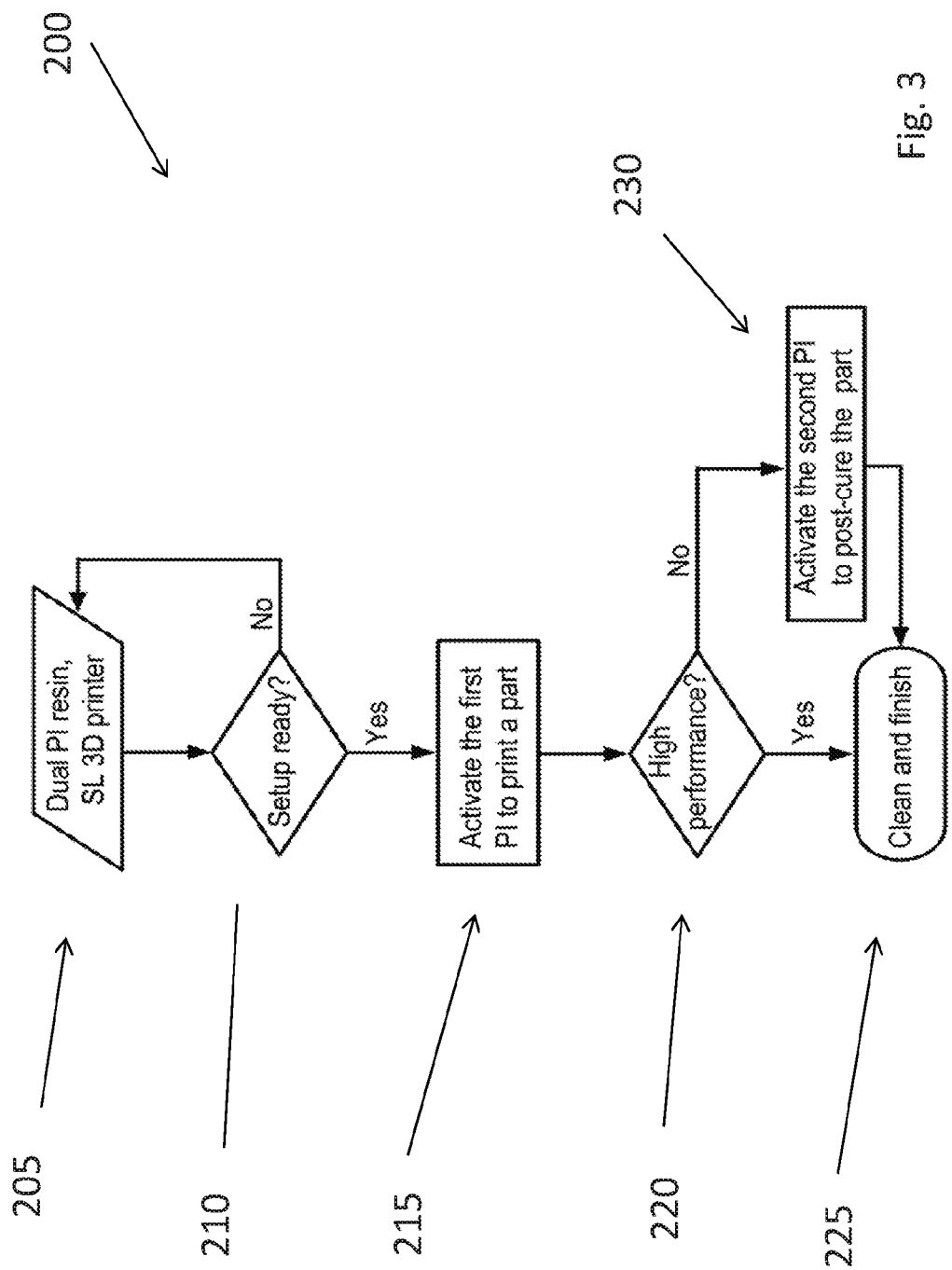
FIG. 3 illustrates a flowchart detailing a dual photoinitiator process according to the embodiments of the present invention.

FIG. 3 shows a flowchart 200 detailing a dual photoinitiator process according to the embodiments of the present invention. The liquid photopolymer resin or dual photoinitiator resin contains two different photo initiators with different absorption spectra. The first photoinitiator has an absorption range within a range of a light source used in an additive manufacturing process. The first light source is the light source of the additive manufacturing device. The first photoinitiator is activated by the first light source to harden or cure the printed 3D object. Depending whether or not the printed objects reach a targeted performance, post-curing may be necessary. If post-curing is required for the dual photoinitiator resin system, the second photoinitiator, as described above, has an absorption range outside the range of the light source used by the additive manufacturing device. The second photoinitiator is therefore passive and was not activated by the first light source during the additive manufacturing process. The second photoinitiator instead has an absorption range that is within a wavelength of a second light source and is exposed to the second light source after the completion of the additive manufacturing process. During post-curing, the 3D printed part is exposed to the second light source after the additive manufacturing process. Exposing the uncured photopolymer resin to the second light source initiates a polymerization process with the second photoinitiator. The absorption range of the second photoinitiator may cover the wavelength of the second light source but not the first light source.

Accordingly, at 205, the additive manufacturing device contains the resin having dual photoinitiators. At 210, it is determined is the additive manufacturing device is setup. If so, at 215, the first photoinitiator is activated. At 220, it is determined if the printed 3D object meets the established high performance standard. If so, at 225, the printed 3D object is cleaned and finished. If the printed 3D object does not meet the high performance standard, at 230, the printed 3D object is subject to the post-cure activation of the second photoinitiator (i.e., application of second light source) prior to being cleaned and finished at 225.

Figure 4:
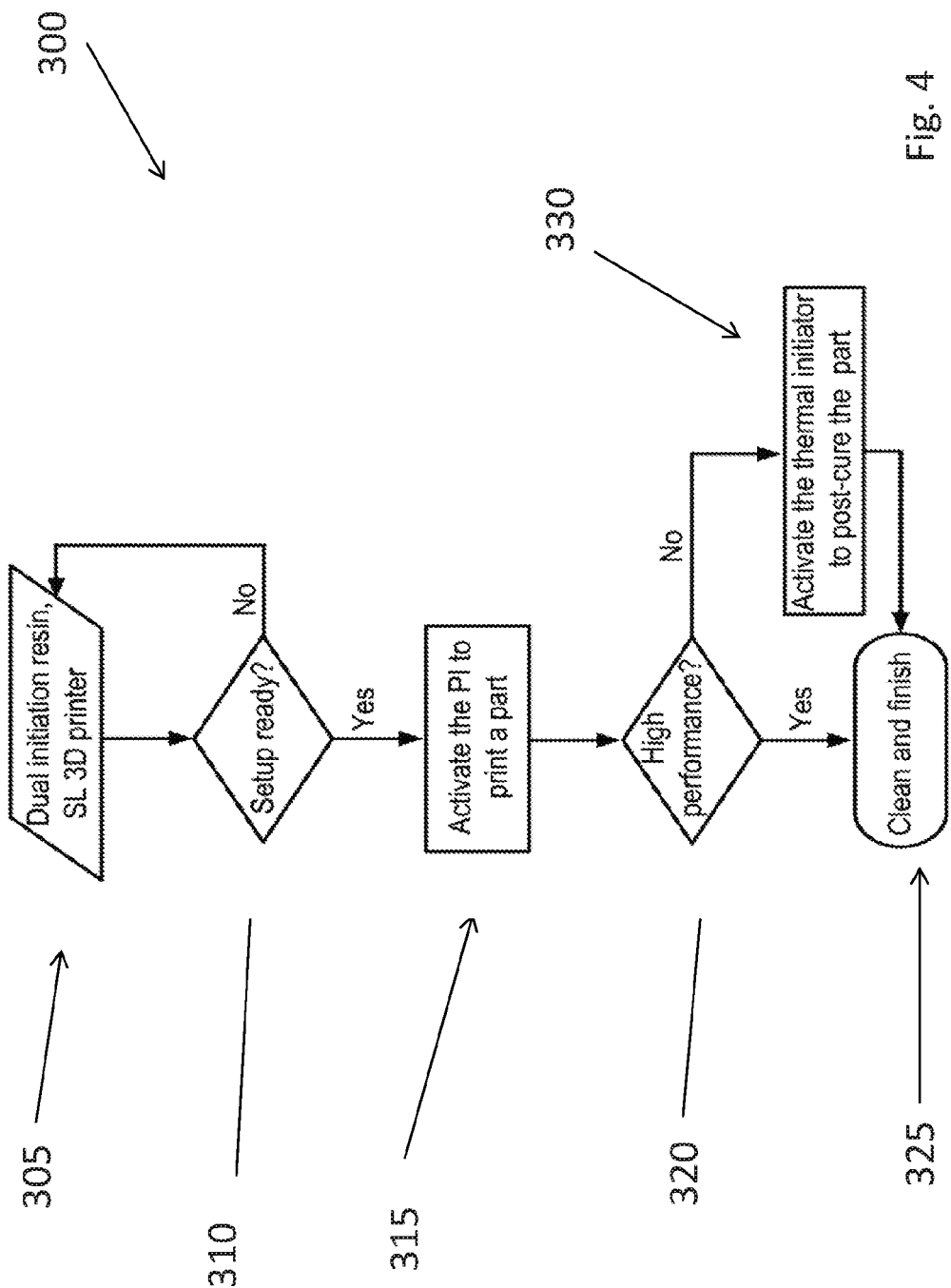
FIG. 4 illustrates a flowchart detailing a photoinitiator and thermal initiator process according to the embodiments of the present invention.

FIG. 4 shows a flowchart 300 detailing a photoinitiator and thermal initiator process according to the embodiments of the present invention. During the printing process, the photoinitiator has an absorption range within a range of a light source used in an additive manufacturing process. The first light source is the light source of the additive manufacturing device. Only the photoinitiator is activated by the first light source to harden or cure the printed 3D object. Depending on whether or not the printed objects reach a pre-established targeted performance, post-curing may be necessary. If post-curing is required for the dual initiation resin system, the thermal initiator, as described above, is activated within a specific temperature range outside of the temperature range of encountered during the additive manufacturing process. Accordingly, the photopolymer resin is exposed to the first light source during the additive manufacturing process to initiate a reaction with the photoinitiator. During post-curing, the 3D printed part is exposed to a baking process whereby the 3D printed object is subjected to a temperature or temperatures which cause the thermal initiator to be activated to finalize the curing process.

Accordingly, at 305, the additive manufacturing device contains the resin having dual photoinitiators. At 310, it is determined is the additive manufacturing device is setup. If so, at 315, the photoinitiator is activated. At 320, it is determined if the printed 3D object meets the established high performance standard. If so, at 325, the printed 3D object is cleaned and finished. If the printed 3D object does not meet the high performance standard, at 330, the printed 3D object is subject to the post-cure activation of the thermal initiator (i.e., baking to a temperature range) prior to being cleaned and finished at 325.

While the foregoing written description of the embodiments of the present invention enable one of ordinary skill to make and use what is considered presently to be the best mode thereof, those of ordinary skill will understand and appreciate the existence of variations, combinations, and equivalents of the specific embodiment, method, and examples herein. The invention herein should therefore not be limited by the above-described embodiments, methods, and examples, but by all embodiments and methods within the scope and spirit of the invention as claimed.

We claim:

1. A 3D printing resin formulation comprising: about 0.98% by weight of a photoinitiator in the form of acyl phosphine oxide; about 0.98% by weight of a thermal initiator in the form of benzoyl peroxide; about 68.50% by weight of an oligomer in the form of a low viscosity aliphatic urethane diacrylate; about 24.49% by weight of a monomer in the form of dipropylene glycol diacrylate; and about 0.10% weight of a light blocker and optical brightener in the form of 2,2'-(2,5-thiophenediyl)bis(5-tert-butylbenzoxazole).

2. The 3D printing resin formulation of claim 1 further comprising about 4.95% by weight of a second monomer in the form of a low odor monofunctional acrylated aliphatic epoxy.

3. A 3D printing resin formulation comprising about 0.98% by weight of a photoinitiator in the form of acyl phosphine oxide; about 68.50% by weight of an oligomer in the form of a low viscosity aliphatic urethane diacrylate; about 24.49% by weight of a monomer in the form of dipropylene glycol diacrylate; about 0.10% by weight of a light blocker and optical brightener in the form of 2,2'-(2,5-thiophenediyl)bis(5-tert-butylbenzoxazole); and a thermal initiator having an initiation temperature range higher than a temperature reached during a 3D printing process and lower than a maximum temperature that a printed 3D object can maintain its structure after a post 3D printing baking process.

* * * * *